United States Patent [19]
Mink

[11] Patent Number: 6,158,774
[45] Date of Patent: Dec. 12, 2000

[54] SEAT BELT ANCHOR AND METHOD OF INSTALLATION IN MOBILE VEHICLE

[75] Inventor: Richard A. Mink, Ossian, Ind.

[73] Assignee: Navistar International Transportation Corp, Chicago, Ill.

[21] Appl. No.: 09/491,064

[22] Filed: Jan. 25, 2000

Related U.S. Application Data

[60] Provisional application No. 60/117,803, Jan. 29, 1999.
[51] Int. Cl.[7] .................................................. B60R 22/00
[52] U.S. Cl. .................. 280/801.1; 248/200; 296/190.08
[58] Field of Search ......................... 280/801.1; 297/468; 296/190.08; 248/218.4, 228.1, 200

[56] References Cited

FOREIGN PATENT DOCUMENTS

| 2274813 | 1/1976 | France | 248/228.1 |
|---|---|---|---|
| 1058850 | 1/1976 | Germany | 297/468 |
| 62-39342 | 2/1987 | Japan | 280/801.1 |

*Primary Examiner*—Eric Culbreth
*Attorney, Agent, or Firm*—Jeffrey P. Calfa; Dennis Kelly Sullivan

[57] ABSTRACT

An anchor for a seat belt for a seat for a mobile vehicle such as medium or heavy-duty truck, the vehicle with the seat belt anchor installed, and the process of back fitting an existing vehicle with a seat with a seat belt. The seat belt anchor may be installed in a vehicle cab either during manufacture of the vehicle or in the after market. The anchor provides the surface area required for providing the strength required by Federal Law and fits around existing components of the cab. The anchor has at minimum three sides to roughly form a 'U' shape to fit around a vertical gusset and mounting surfaces or flaps or engagement to the cab structure. The critical geometry is that the anchor will fit around a vertical gusset or cab support. In the primary embodiment, the anchor has 5 sides. The three center sides generally form a 'U' shape when viewed at a downward angle from the rear of the cab. The 'U' will fit around a rectangular cross-sectioned vertical gusset or cab support. The anchor may be installed in conjunction with the installation of a seat into the cab of a truck following completion of the cab structure. The back floors of truck cabs generally have a horizontal sill. The sill contains a hollowed out region. The anchor is installed to the cab by drilling an access hole and mounting bolt holes through the top surface of the cab sill. Then two tapping plates are pushed into the sill hollow region through the access hole. Each tapping plate is held against the upper inner surface of the sill. The anchor bracket is then bolted to the sill and hence the cab and the tapping plates with mounting bolts through the mounting bolt holes that engage to the tapping plates.

13 Claims, 8 Drawing Sheets

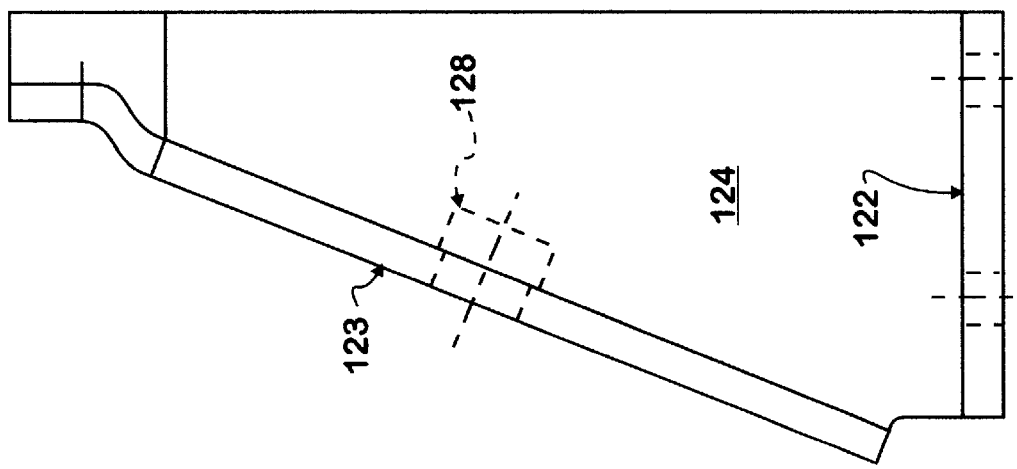
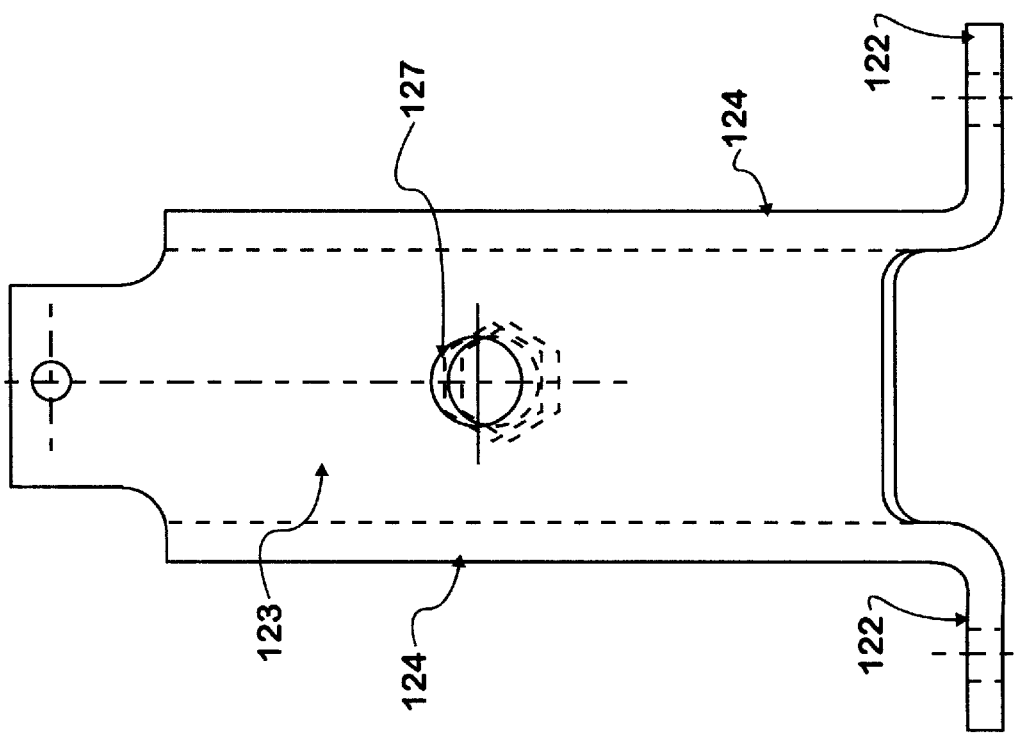

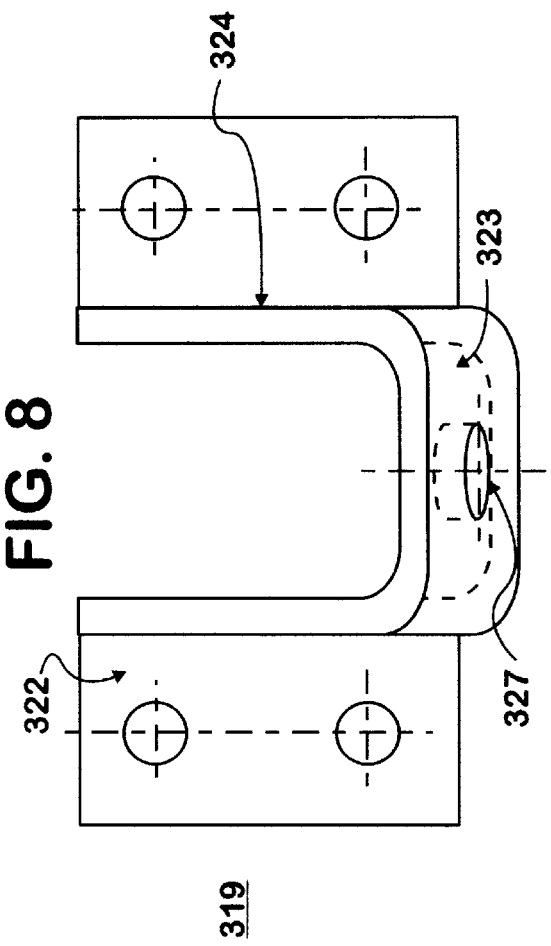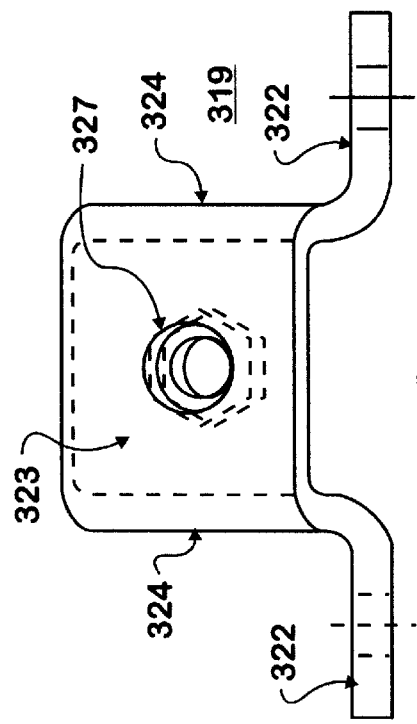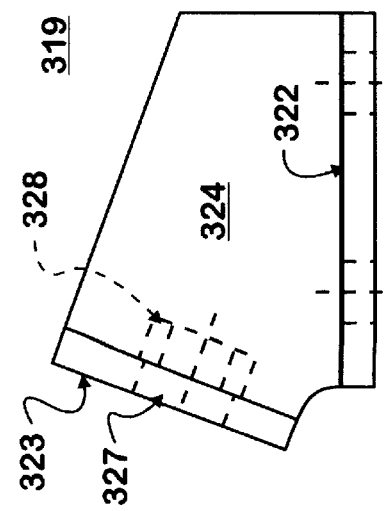

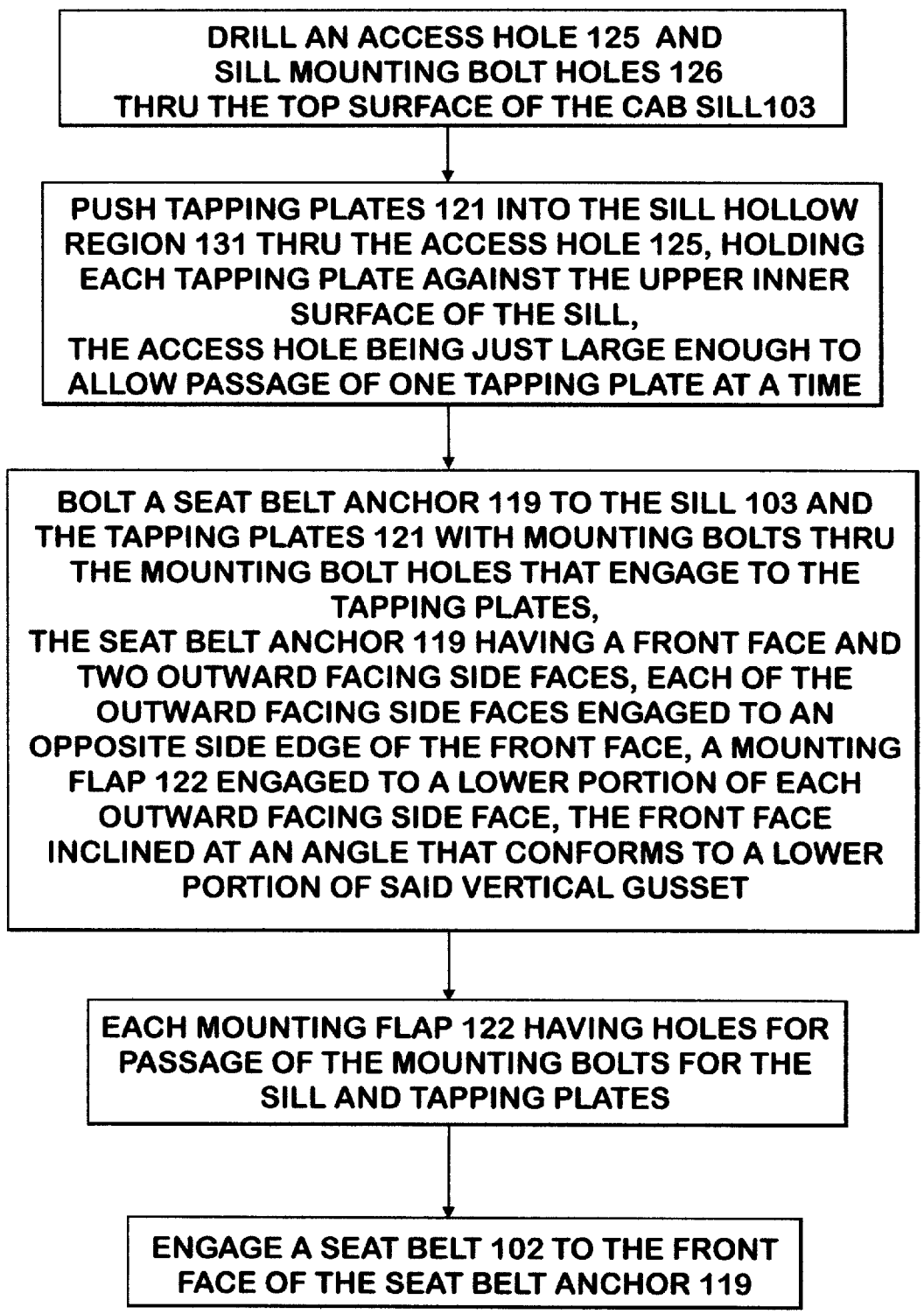

SEAT BELT ANCHOR AND METHOD OF INSTALLATION IN MOBILE VEHICLE

This application claims priority from Provisional Patent Application Ser. No. 60/117,803, filed Jan. 29, 1999.

BACKGROUND

This invention relates to an anchor for a seat belt for a seat for a mobile vehicle such as medium or heavy-duty truck, the vehicle with the seat belt anchor installed, and the process of back fitting an existing vehicle with a seat with a seat belt. The seat belt anchor may be installed in a vehicle cab either during manufacture of the vehicle or in the after market. The anchor provides the surface area required for providing the strength required by Federal Law and fits around existing components of the cab.

PRIOR ART

In the prior art, seat belt anchors for bench type seats for vehicle cabs had to be installed into the cab structure prior to completion of the cab structure. The Federal Motor Vehicle Safety Standard 210, Section 4.2, requires seat belt anchors to meet specified strength limits. One way needed to achieve these limits is to ensure sufficient surface area between the anchor to cab structure fasteners. This was problematic due to existing supports within the cab structure. As far as existing supports inhibiting bench seat belt installation in truck cabs, many truck cabs have vertical gussets running up the rear vertical wall of the cab. A prior art seat belt anchor 210 and configuration is shown in FIG. 1. None of the existing seat belt anchors can provide the strength required by law, be installed after completion of the cab structure, and fit around existing structural components in the vehicle cab such as vertical gussets. The version of prior art shown in FIG. 1 required access to the under side 211 of the cab 201 of the vehicle, which upon installation is a complex if not impossible evolution.

SUMMARY

A primary object of the invention is to provide a seat belt anchor for a vehicle bench seat or for other floor mounting which may provide the necessary holding strength for the seat belt. A second object of the invention is that the seat belt anchor may be installed around existing structural components such as vertical gussets before and after completion of the cab structure. The objects of the invention are satisfied by having a seat belt anchor that has at minimum three sides to roughly form a 'U' shape to fit around a vertical gusset and mounting surfaces or flaps or engagement to the cab structure. The critical geometry is that the anchor will fit around a vertical gusset or cab support. In the primary embodiment, the anchor has 5 sides. The three center sides generally form a 'U' shape when viewed at a downward angle from the rear of the cab. The 'U' will fit around a rectangular cross-sectioned vertical gusset or cab support.

The anchor may be installed in conjunction with the installation of a bench seat into the cab of a truck following completion of the cab structure. The rear floors of truck cabs generally have a horizontal sill. The sill contains a hollowed out region. The anchor is installed to the cab by drilling an access hole and mounting bolt holes through the top surface of the cab sill. Then two tapping plates are pushed into the sill hollow region through the access hole. Each tapping plate is held against the upper inner surface of the sill. The anchor bracket is then bolted to the sill and hence the cab and the tapping plates with mounting bolts through the mounting bolt holes that engage to the tapping plates.

DRAWINGS

Other objects and advantages of the invention will become more apparent upon perusal of the detailed description thereof and upon inspection of the drawings, in which:

FIG. 4 is a front view of one embodiment of a seat belt anchor made in accordance with this invention.

FIG. 5 is a side view of the seat belt anchor shown in FIG. 4.

FIG. 8 is a top down view of a second embodiment of a seat belt anchor made in accordance with this invention.

FIG. 9 is a front view of the seat belt anchor shown in FIG. 8.

FIG. 10 is a side view of the seat belt anchor shown in FIG. 9.

FIG. 12 is a process drawing for installing a seat belt anchor in a truck cab in accordance with this invention.

DETAILS OF INVENTION

Figure 1:
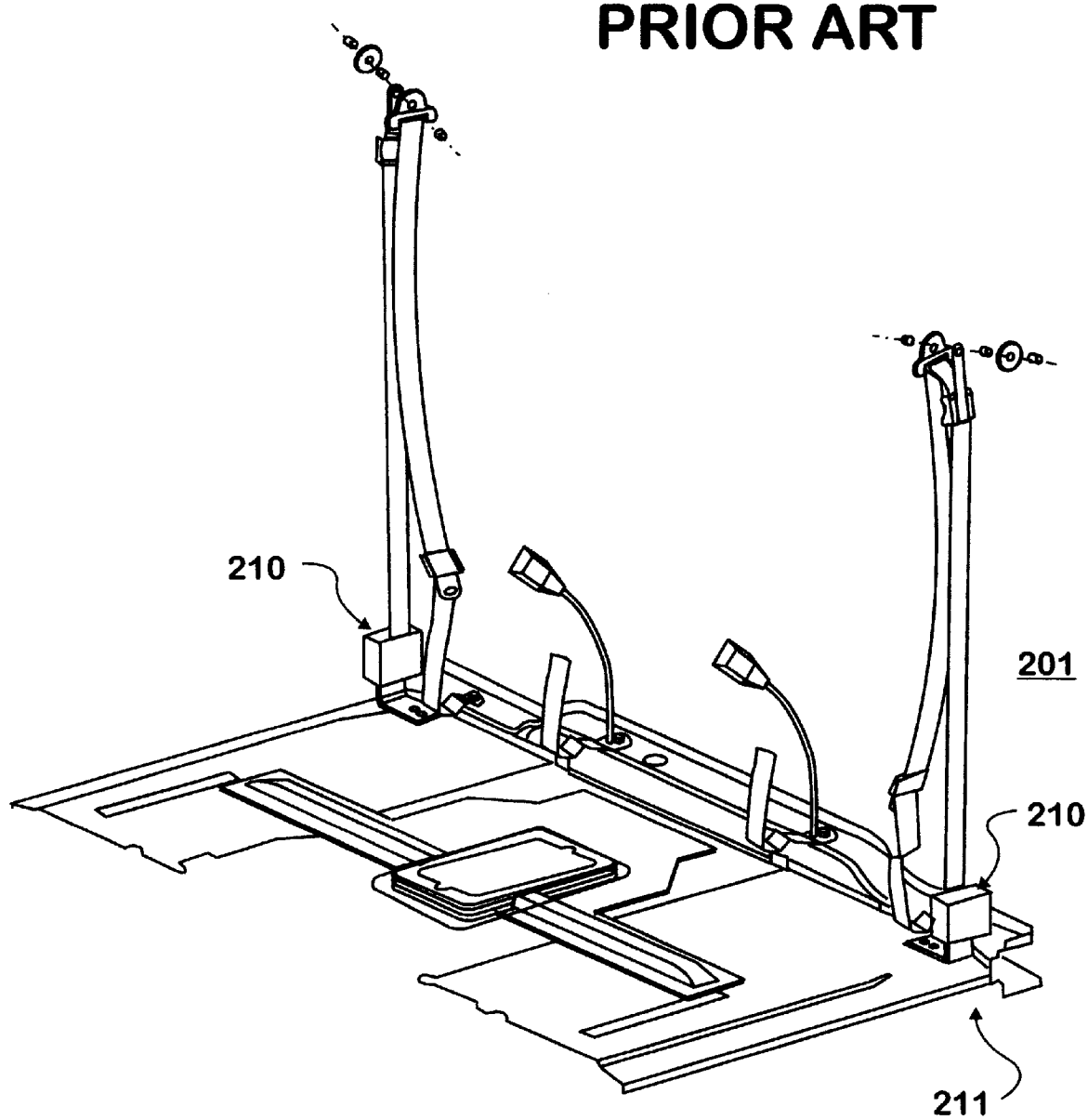
FIG. 1 is a partial cut away view of a truck cab with prior art seat belt anchors mounted through the floor of the truck cab.
Figure 2:
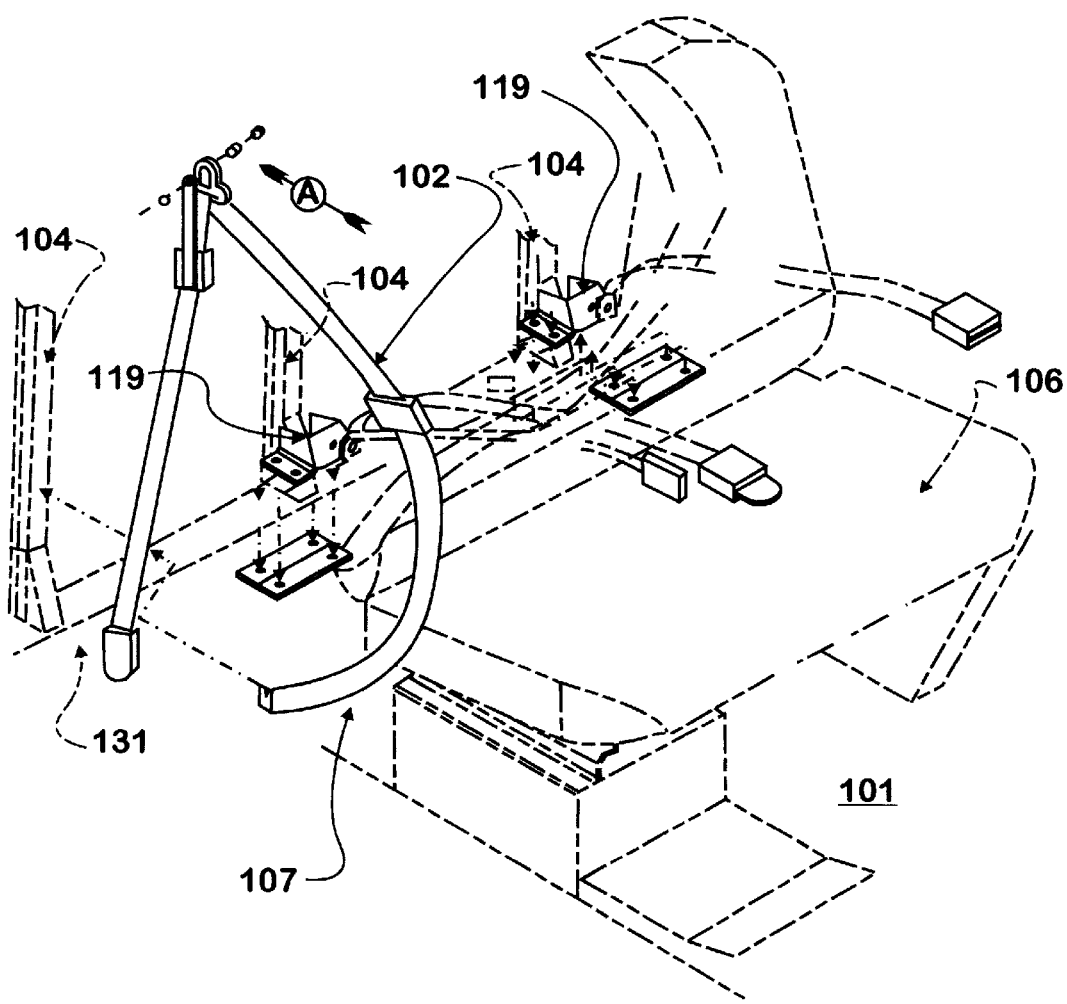
FIG. 2 is a partial cut away view of a truck driver and passenger cab with a seat belt anchor configured and mounted in accordance with this invention.
Figure 3:
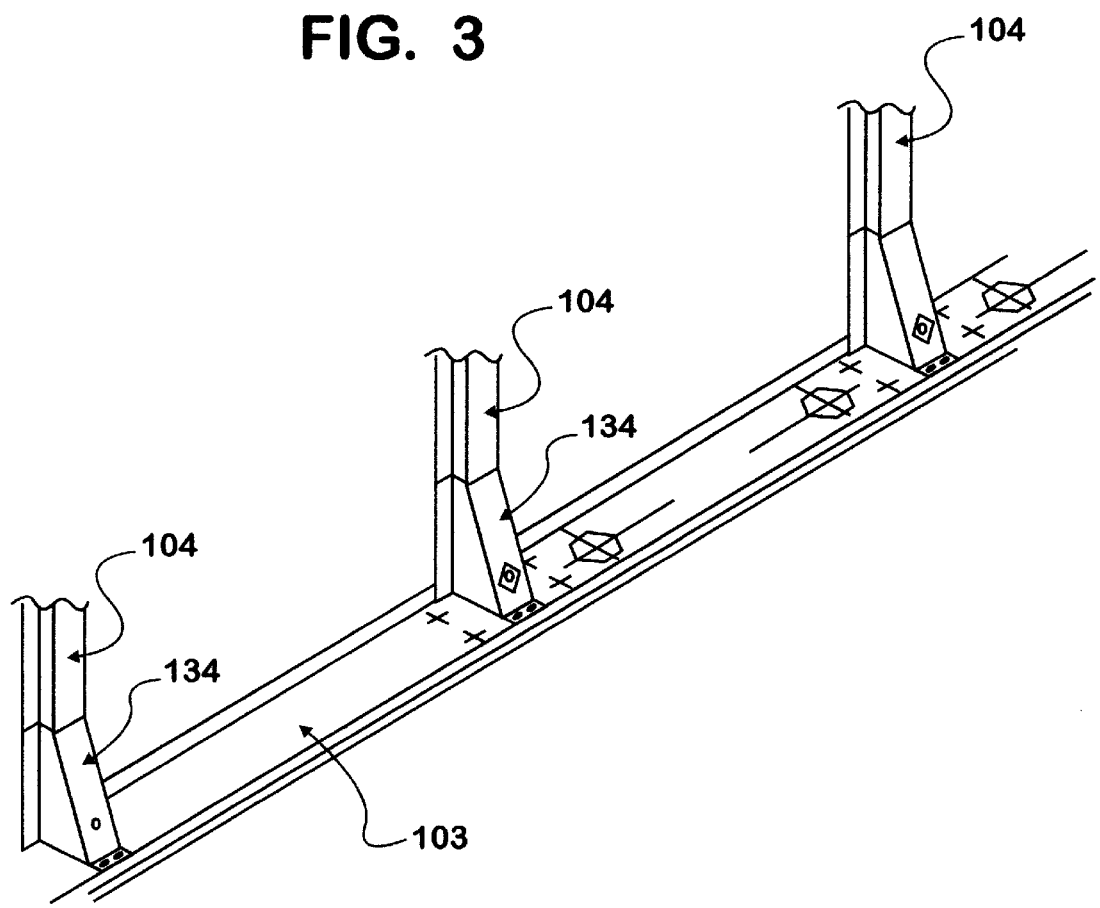
FIG. 3 is a close-up view of vertical gussets on the rear wall of the truck cab partially shown in FIG. 2.

The rear portion of a truck driver and passenger cab 101 with a seat belt anchor 119 configured and mounted in accordance with this invention is shown in FIGS. 2 and 3. A driver's seat, not shown, is located in a forward portion of the cab. This invention is concerned with providing secure seat belts 102 for seats or benches 106 to a floor 107 in the rear of the cab 101. The seat belts 102 are secured to the cab 101 through seat belt anchors 119. The truck cab 101 has a rear sill 103 adjacent to the floor 107; the sill 103 acts as part of the rear structural foundation of the cab 101. The rear sill 103 is generally hollow and formed from sheet metal. The truck cab 101 may have vertical gussets or supports 104 that may provide up-right integrity of the cab 101. The vertical gussets 104 may have angled feet 134 at the engagement areas to the sill 103. Once the cab 101 is installed on a chassis of the vehicle, access to the bottom portion of the cab 101 is difficult without removal of the cab 101. Seat belts 102 are required to provide minimum support to passengers in the event of an accident. Prior art seat belts 102 were engaged to anchors that passed through the floor of the cab 101. Hence, the back fitting of a seat belt for an added seat such as a rear bench seat 106 was a complex evolution involving reduced visibility under the bottom of the cab 101 or involving removal of the cab 101.

The basic form of the invention includes a seat belt anchor 119 and a tapping plate 121 that are engaged to a rear sill 103 of a truck cab 101. The seat belt anchor 119 has at minimum three sides to roughly form a 'U' shape to fit around a vertical gusset 104 and mounting surfaces or flaps 122 for engagement to the cab structure. The critical geometry is that the seat belt anchor 119 will fit around a vertical gusset 104 or cab support. In the preferred embodiment, the anchor 119 has 5 sides. There are three center sides: a front face 123, and two (2) outward facing side faces 124. The front face 123 and the outward facing side faces 124 generally form the 'U' shape when viewed at a downward angle from the rear of the cab 101. The outward facing side faces 124 are engaged to opposite edges of the front face 123. The 'U' shape of the anchor 119 will fit around three sides of a rectangular cross-sectioned vertical gusset 104 or cab support. The front face 123 is at an angle where necessary to fit up against the mating portion or angled foot 134 of the vertical gusset 104. This arrangement is shown in the attached FIG. 2.

The preferred embodiment additionally has two other sides. These are the mounting flaps 122. The three center sides, the angled front face 123 and the outward facing side faces 124, are engaged to each other and to the mounting flaps 122, as shown in FIGS. 3 and 4. As mentioned above, the outward facing side faces 124 of the 'U' of the anchor 119 may be shaped in the side view so that the angled front face 123 is tilted at an angle to the vertical and to the horizontal. The outward facing side faces 124 of the 'U' of the anchor 119 may be trapezoidal to affect this angle of the front face 123 of the 'U'. This angle of the mounting surface of the front face 123 may allow engagement to the seat belts while allowing free movement of the belt. The front face 123 may have at least one belt-mounting hole 127 for engagement to a seat belt. A rear portion of the front face 123 may have a weld nut 128 corresponding to the belt-mounting hole 127 and for easy engagement to a seat belt 102. Weld nuts are standard fastener nuts that are welded or otherwise permanently fixed to a surface of a first object to which a second object is engaged by fasteners sized to mate with the fastener nuts. The angle of inclination of the front face 123 allows the seat belt 102 to move freely without catching on a portion of the anchor 119.

The anchor 119 in the preferred embodiment is made out of an A-6 steel, grade 4B (A-36) approximately 0.25 inches thick. In other embodiments, the anchor 119 material may be any strong material with the thickness being appropriate to ensure a firm stable mounting. The mounting flaps 122 may generally be any shape; however they must provide the access to reach the bolts and a sturdy surface to allow engagement. In the preferred embodiment the mounting flaps 122 are rectangular shaped, also made of A-6 steel approximately 0.25 inches thick, and are integral to the outward facing side faces 124. The shape of the mounting flaps 122 and their relative location on each side of the outward facing side faces 124 of the 'U' of the anchor 119 allow for strength and stability to the mounting configuration.

Figure 6:
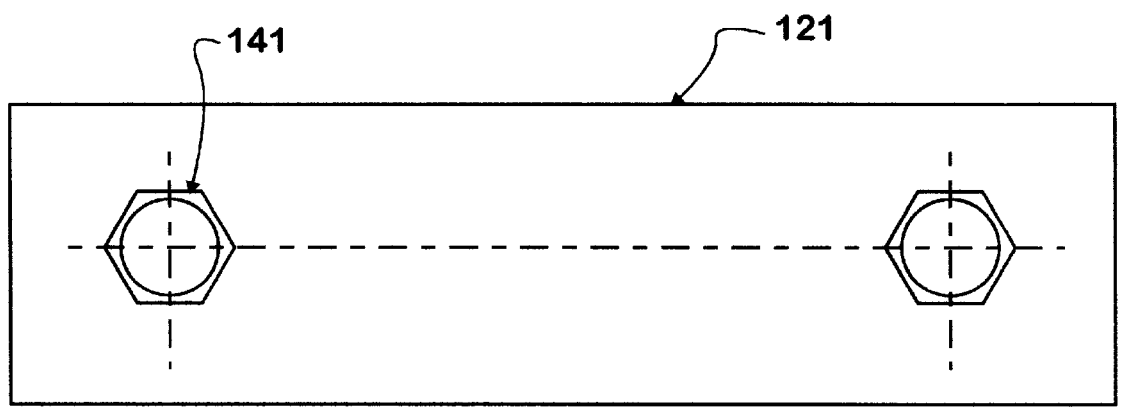
FIG. 6 is a top view of a tapping plate used for mounting a seat belt anchor in accordance with this invention.
Figure 7:
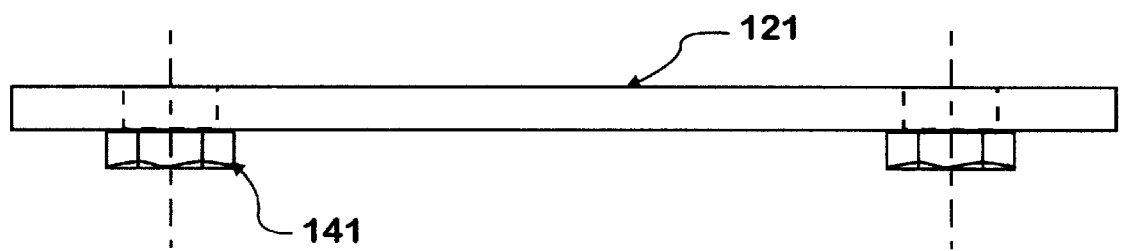
FIG. 7 is a side view of the tapping plate of FIG. 6.
Figure 11:
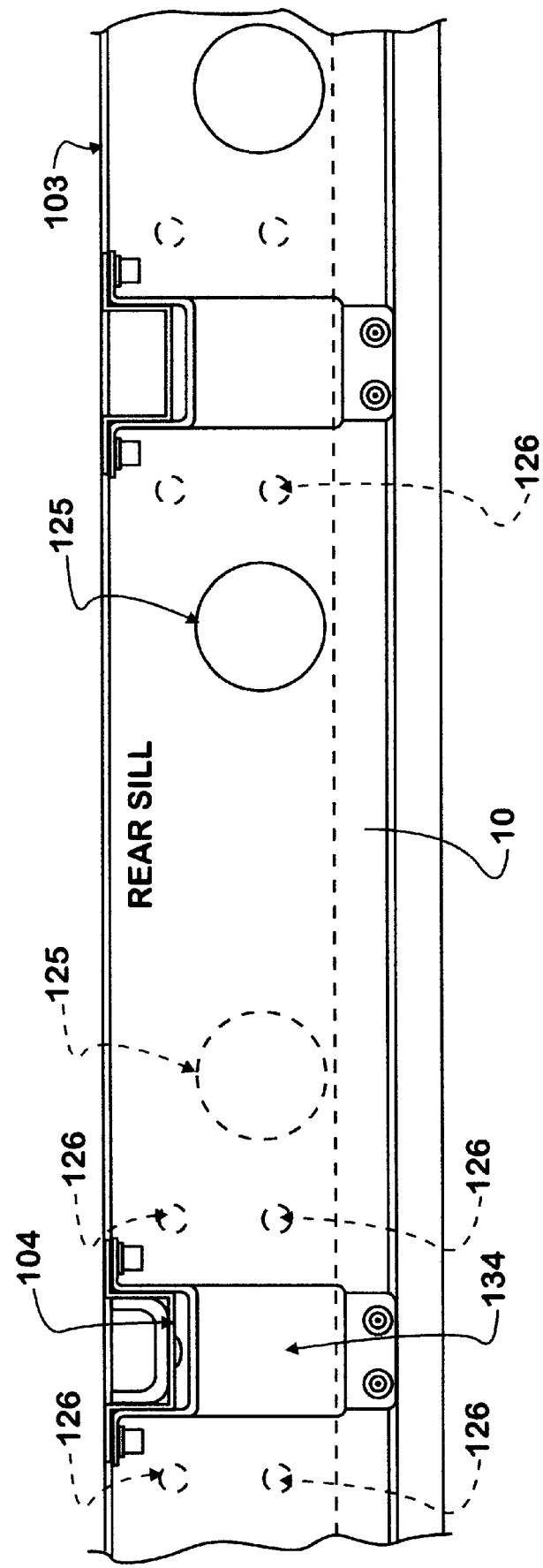
FIG. 11 is a top down view of a rear sill of the truck cab of FIG. 2, shown with mounting hole locations for a seat belt anchor and tapping plate made in accordance with this invention.

The seat belt anchor 119 may be installed in conjunction with the installation of a bench seat 106 into the cab 101 of a vehicle following completion of the cab structure. See FIG. 12 The rear floors 107 of truck cabs may have a horizontal sill 103 as shown in FIGS. 2 and 11. The sill 103 may contain a hollowed out region 131. The anchor 119 is installed to the cab 101 by drilling an access hole 125 and sill mounting bolt holes 126 through the top surface of the cab sill 103. Then two tapping plates 121 are pushed into the sill hollow region 131 through the access hole 125, the access hole 125 being just large enough to allow passage of one tapping plate at a time. Each tapping plate 121 is held against the upper inner surface of the sill 103. The seat belt anchor 119 is then bolted to the sill 103 and hence the cab 101 and the tapping plates 121 with mounting bolts through the mounting bolt holes 126 that engage to the tapping plates 121. Use of two tapping plates 121 allows for a smaller access hole 125 through the sill 103. The wider spacing of the mounting flaps 122 of the anchor 119 provides extra strength to the seat belt anchor 119. The tapping plates 121 may have weld nuts 141 engaged. The engagement bolts that are passed through the mounting bolt holes 126 of the sill 103 will be affixed to the weld nuts 141. See FIGS. 6 and 7

The seat belt anchor 119 may be single piece stamping. While the anchor 119 is designed for providing seat belt 102 mounting for a bench seat 106 for a vehicle, the method may be applied to the mounting to a completed cab 101 around existing structural components to hold a seat belt 102.

FIGS. 8 to 10 show of a second embodiment of a seat belt anchor 319 made in accordance with this invention. The seat belt anchor 319 has at minimum three sides to roughly form a 'U' shape to fit around a vertical gusset and mounting surfaces or flaps 322 for engagement to the cab structure. The critical geometry is that the seat belt anchor 319 will fit around a vertical gusset 104 or cab support. In the second embodiment, the anchor 319 also has 5 sides. There are three center sides: a front face 323, and two (2) outward facing side faces 324 The front face 323 and the outward facing side faces 324 generally form the 'U' shape when viewed at a downward angle from the rear of the cab 101 The outward lacing side faces 324 are engaged to opposite edges of the front face 323. The 'U' shape of the anchor 319 will fit around three sides of a rectangular cross-sectioned vertical gusset 104 or cab support. The front face 323 is at an angle where necessary to fit up against the mating portion or angled foot 134 of the vertical gusset 104. The second embodiment additionally has two other sides. These are the mounting flaps 322. The three center sides, the angled front face 323 and the outward facing side faces 324, are engaged to each other and to the mounting flaps 322, as shown in FIGS. 8 to 10. As mentioned above, the outward facing side faces 324 of the 'U' of the anchor 319 may be shaped in the side view so that the angled front face 323 is tilted at an angle to the vertical and to the horizontal. The outward facing side faces 324 of the 'U' of the anchor 319 may be trapezoidal to affect this angle of the front face 323 of the 'U'. This angle of the mounting surface of the front face 323 may allow engagement to the seat belts while allowing free movement of the belt. The front face 323 may have at least one belt-mounting hole 327 for engagement to a seat belt. A rear portion of the front face 323 may have a weld nut 328 corresponding to the belt-mounting hole 327 and for easy engagement to a seat belt.

As described above, the seat belt anchor 119, a cab 101 with the seat belt anchor 119 installed, and the method of installation of the seat belt anchor 119 provide a number of advantages, some of which have been described above and others of which are inherent in the invention. Also modifications may be proposed to the seat belt anchor 119 of the present invention, a cab 101 with the seat belt anchor 119 installed, and the method of installation of the seat belt anchor 119 without departing from the teachings herein.

I claim:

1. A seat belt anchor for engaging a seat belt for a vehicle seat to a vehicle cab, the cab having a sill the sill having a hollow region, and the cab having vertical gussets engaged to the sill, comprising:

a front face;

two outward facing side faces, each said outward facing side face is engaged to an opposite side edge of the front face;

a mounting flap engaged to a lower portion of each outward facing side face;

said front face being inclined at an angle allowing free movement of a seat belt when a seat belt is engaged;

said inclination of said front face conforming to a lower portion of the vertical gussets;

said front face having a belt mounting hole for engagement to a seat belt;

said front face and said outward facing side faces forming a 'U' shape when viewed at a downward angle;

said inclination of said front face conforming to an angled foot lower portion of the vertical gusset;

said outward facing side faces are trapezoidal in a side view to affect said inclination of said front face; and said front face having one belt-mounting hole for engagement to a seat belt;

a rear portion of said front face has a weld nut corresponding to said belt-mounting hole for engagement to a seat belt.

2. A drier and passenger cab of a mobile vehicle, comprising:

a vehicle seat engaged to a floor;

a sill adjacent to said floor;

a vertical gusset for structural support engaged to said sill;

a seat belt anchor engaged to a seat belt for said vehicle seat;

said seat belt anchor having a front face and two outward facing side faces;

each said outward facing side face engaged to an opposite side edge of said front face;

a mounting flap engaged to a lower portion of each outward facing side face;

said front face being inclined at an angle allowing free movement of said seat belt;

said inclination of said front face conforming to a lower portion of said vertical gusset; and each said mounting flap engaged to said sill through fasteners through sill mounting holes in said sill.

3. The vehicle of claim 2, comprising:

said sill having a hollow region; and a first tapping plate interior to said sill hollow region and engaged to said sill through said fasteners holding said mounting flaps of said seat belt anchor to said sill.

4. The vehicle of claim 3, wherein:

said first tapping plate has weld nuts for engagement by said fasteners holding said mounting flaps of said seat belt anchor to said sill.

5. The vehicle of claim 4, wherein:

a second tapping plate interior to said sill hollow region and engaged to said sill through said fasteners holds said mounting flaps of said seat belt anchor to said sill; and said second tapping plate has weld nuts for engagement by said fasteners holding said mounting flaps of said seat belt anchor to said sill.

6. The vehicle of claim 5, wherein:

an access hole in said sill for allowing individual passage of said first tapping plate or said second tapping plate.

7. The vehicle of claim 6, wherein:

said front face and said outward facing side faces of said seat belt anchor form a 'U' shape when viewed at a downward angle; and said outward facing side faces are trapezoidal in a side view to affect said inclination of said front face.

8. The vehicle of claim 7, wherein:

said front face has one belt-mounting hole for engagement to a seat belt; and a rear portion of said front face has a weld nut corresponding to said belt-mounting hole for engagement to a seat belt.

9. The vehicle of claim 8, wherein:

said front face, said outward facing side faces, and said mounting flaps are integral to each other and made of an approximately 0.25 inch thick steel.

10. A method for installing a seat belt for a seat in a cab of a mobile vehicle, the cab having a sill, the sill having a hollow region, and the cab having vertical gussets attached to the sill, comprising the steps of:

drilling an access hole and sill mounting bolt holes through a top surface of the cab sill;

pushing two tapping plates into the sill hollow region through the access hole, holding each tapping plate against an upper inner surface of the sill, the access hole being just large enough to allow passage of one tapping plate at a time;

bolting a seat belt anchor to the sill and the tapping plates with mounting bolts through the mounting bolt holes that engage to the tapping plates, the seat belt anchor having a front face and two outward facing side faces, each of the outward facing side faces engaged to an opposite side edge of the front face, a mounting flap engaged to a lower portion of each outward facing side face, the front face inclined at an angle that conforms to a lower portion of said vertical gusset, and each mounting flap having holes for passage of the mounting bolts for the sill and tapping plates; and engaging a seat belt to the front face of the seat belt anchor.

11. The method of claim 10, wherein:

the tapping plates have weld nuts for engagement by the bolting holding the mounting flaps of the seat belt anchor to the sill.

12. The method of claim 11, wherein:

the front face and the outward facing side faces of said seat belt anchor form a 'U' shape when viewed at a downward angle;

the inclination of the front face conforms to an angled foot lower portion of the vertical gusset; and the outward facing side faces are trapezoidal in a side view to affect the inclination of the front face.

13. The method of claim 12, wherein:

the front face has one belt-mounting hole for engagement to the seat belt; and a rear portion of the front face has a weld nut corresponding to the belt-mounting hole for engagement to the seat belt.

* * * * *